(12) United States Patent
Green et al.

(10) Patent No.: US 6,750,514 B2
(45) Date of Patent: Jun. 15, 2004

(54) DISPLAY HAVING UNIVERSAL ACTIVE MATRIX

(75) Inventors: Peter W. Green, Reigate (GB); Stephen J. Battersby, Haywards Heath (GB); John R. Hughes, Horley (GB); Ian D. French, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/264,908

(22) Filed: Oct. 4, 2002

(65) Prior Publication Data

US 2003/0085427 A1 May 8, 2003

(30) Foreign Application Priority Data

Nov. 7, 2001 (GB) ............................................. 0123720

(51) Int. Cl.[7] ......................... H01L 27/01; H01L 27/12; H01L 31/0392
(52) U.S. Cl. ............................ 257/350; 257/59; 257/72
(58) Field of Search ............................. 257/59, 72, 350

(56) References Cited

U.S. PATENT DOCUMENTS

| | | | |
|---|---|---|---|
| 5,874,746 A | * | 2/1999 | Holmberg et al. ............ 257/59 |
| 6,191,831 B1 | * | 2/2001 | Kim et al. ..................... 349/43 |
| 6,352,869 B1 | * | 3/2002 | Guidash ......................... 438/16 |
| 6,469,318 B2 | * | 10/2002 | Yamada et al. ................ 257/59 |
| 2001/0030322 A1 | * | 10/2001 | Yamazaki et al. ............. 257/59 |
| 2002/0028540 A1 | * | 3/2002 | Takizawa et al. ............ 438/149 |

FOREIGN PATENT DOCUMENTS

EP            0617310          9/1994         ......... G02F/1/1335

OTHER PUBLICATIONS

Saito et al: "A high picture quality LC–TV using triangle trio–color dots addressed by a–Si TFTs" Conference Record Of The 1985 International display Research conference (CAT. No. 85CH2239–2), San Diego, CA, USA, Oct. 15–17, 1985, pp 27–29.

* cited by examiner

Primary Examiner—Ngân V. Ngô

(57) ABSTRACT

A method of constructing an active matrix pixel device uses a universal active matrix (UAM) (81) comprising a matrix array of switching elements (20) whose spacing defines a base pitch and a pixel array comprising a matrix array of pixel electrodes (19) whose spacing defines a pixel pitch. The pixel pitch is greater than the base pitch. A large proportion of the construction process can be carried out before the customisation of the device. Using a common UAM (81) enables a reduction in the time between the customer ordering the device and the completion time. The cost of meeting customer specific requirements for the fabrication of active matrix pixel devices is thus reduced.

15 Claims, 8 Drawing Sheets

DISPLAY HAVING UNIVERSAL ACTIVE MATRIX

BACKGROUND AND SUMMARY

This invention relates to active matrix pixel devices and their method of fabrication, and more particularly, but not exclusively, to the customisation of active matrix displays, and especially active matrix liquid crystal displays (AMLCDs), where a range of pixel pitches can be achieved from an initial universal active matrix.

Examples of active matrix pixel devices other than display devices include sensing devices such as image sensing devices and fingerprint sensing devices in which the matrix elements comprise for example optical or capacitance sensing elements, transducer devices, in which the matrix elements comprise moveable electromechanical elements, for example piezoelectric or electrostatically controlled actuator elements.

Active matrix pixel devices, such as AMLCDs, are used in an increasingly wide variety of products, including consumer electronics, computers and communication devices. Such devices are often included in portable products where the size and compactness of the product are particularly important considerations.

An example of such a device is described in EP-A-0617310. In this device, a row and column matrix array of display pixels is provided, each of which is driven via an associated switching element in the form of a TFT (thin film transistor). As is usual, the device comprises a layer of liquid crystal (LC) material disposed between a pair of spaced substrates carrying electrodes which define individual display pixels. The TFTs are carried on the surface of a first substrate together with sets of row, (scanning), conductors and column, (data), conductors through which the TFTs are addressed for driving the display pixels. Each TFT is disposed adjacent the intersection between respective ones of the row and column conductors. The gates of all the TFTs associated with a row of display pixels are connected to a respective row conductor and the sources of all the TFTs associated with a column of pixels are connected to a respective column conductor. This forms an array of active cells in which each cell comprises a TFT having associated row and column conductors. An array of reflective metal pixel electrodes is carried on an insulating film which extends over the first substrate and covers the TFTs and the sets of address conductors so that the pixel electrodes are positioned generally above the level of the TFTs and the address conductors. As is conventional, each pixel electrode is associated with one respective TFT. Each individual pixel electrode is connected to an underlying contact electrode, which is integral with the drain electrode of its associated TFT, through a respective opening formed in the insulating film directly over the contact electrode. With this type of construction, in which the array of pixel electrodes and the array of TFTs are provided at respective different levels above the substrate surface, the pixel electrodes can be enlarged such that at two opposing sides they extend slightly over adjacent row conductors and at their two other opposing sides they extend slightly over adjacent column conductors, rather than being sized smaller than the spacing between adjacent row conductors and adjacent column conductors with gaps provided between each edge of the pixel electrode and the adjacent conductor, as in display device arrangements in which the individual pixel electrodes are arranged substantially co-planar with, and laterally of, the TFTs. In this way, therefore, the pixel aperture is increased and in operation more light which passes through the LC layer and reaches the pixel electrode is reflected back to produce a brighter display output. Moreover, parts of a deposited metal layer which is patterned to form the reflective pixel electrodes can be left immediately overlying the TFTs during the patterning process so as to act as light shields for the TFTs to reduce photoelectric effects in the TFTs due to light incident thereon, thereby avoiding the need to provide black matrix material on the other substrate for this purpose. The substrate carrying the TFTs, address conductors and pixel electrodes constitutes the active plate of the display device. The other, transparent, substrate constitutes the passive plate and carries a continuous transparent electrode common to all pixels in the array and an array of colour filter elements corresponding to the array of pixels with each filter element overlying a respective pixel electrode.

In order to supplement the capacitance of each LC cell in an AMLCD, a storage capacitance is commonly provided in parallel with the LC cell. This is required to maintain the desired voltage across the cell when the driving signal is removed. One example method of providing a storage capacitor is to form an extra conductive layer over the contact electrode with a dielectric material sandwiched in between.

Conventionally, the active matrix array is fabricated by depositing on the substrate various layers of conductive, insulating and semiconductive layers and patterning these layers using a photolithographic definition process involving photolithographic masks that determine the pattern of individual layers.

There is growing interest in making AMLCDs which can be easily, quickly and cheaply customised to the needs of a particular application. For example, different customers may require displays having different and specific pixel pitches. This is especially true for small/mid-sized displays for applications in portable products, such as mobile phones, PDAs, and the like, where the market is characterised by constant change in product ranges and hence display designs.

It is well known in the art that to produce a batch of displays to a new design requires a complete new set of photolithography masks. A problem is that this can make customised AMLCDs rather expensive, as the investment costs in a mask set are high and the total number of displays over which these costs can be recovered may be quite small. In addition, lead times can be long as masks must be designed for each specific customer requirement and each customer specific product must then be processed through to completion.

It is an object of the present invention to provide an improved method of producing an active matrix pixel device.

It is another object of the present invention to provide a method of producing an active matrix pixel device allowing for a cost reduction in meeting customer specific requirements.

According to one aspect of the present invention there is provided a method of constructing an active matrix pixel device comprising:

providing a universal active matrix comprising on a substrate a matrix array of switching elements whose spacing defines a base pitch and sets of row address conductors and column address conductors for addressing the switching elements;

forming on the substrate a dielectric layer over the array of switching elements, forming an array of contact holes in the dielectric layer such that contact can be made with a plurality of switching elements, forming a pixel array on the universal active matrix, the pixel array comprising a matrix array of pixel electrodes in electrical contact with underlying switching elements via the contact holes, the spacing of the pixel electrodes defining a pixel pitch, wherein the pixel pitch is greater than the base pitch.

When the universal active matrix (UAM) has been formed on the first substrate, the partly constructed device can be stockpiled if required. The pixel array with a desired pixel pitch can then be formed at a later stage to meet the customers' requirements. One advantage that the invention provides is that a large proportion of the production process can be carried out before the customisation. Such a method enables active matrix pixel devices of differing designs, e.g. having different pixel electrode layouts, to be fabricated more readily, and less expensively, than previously. Using a common UAM, which can be stockpiled for convenience, enables a reduction in the time between the customer ordering the device and the completion time. Another advantage is that less mask sets are required for each new custom active matrix pixel device as the same masks can be used for each UAM. This reduces the cost of customised devices.

According to another aspect of the invention there is provided an active matrix pixel device comprising a universal active matrix having a matrix array of switching elements arranged so as to define a base pitch, and a pixel layer having a matrix array of pixel electrodes arranged so as to define a pixel pitch, wherein the pixel pitch is greater than the base pitch.

The switching elements of the UAM are preferably addressed by respective row and column address conductors as described previously. Each switching element with its respective row and column address conductors forms an active cell. The spacing of the active cells defines the base pitch. The spacing may not necessarily be the same in the horizontal (row) and vertical (column) directions and so the base pitch can be sub-divided into horizontal and vertical components if necessary. The base pitch is preferably made as small as is conveniently possible. This defines the minimum achievable pitch of the final active matrix pixel device. By minimising the base pitch in this way the range of achievable pixel pitches for the final product is increased.

In a preferred embodiment a dielectric layer overlies the array of switching elements, preferably comprising a polymer material and covering the whole array. This acts to reduce significantly capacitive coupling between the overlying pixel electrode layer and the underlying UAM.

The switching elements preferably comprise thin film transistors (TFTs) as known in the art. The TFTs may be top-gate or bottom-gate type TFTs. TFTs in matrix arrays are normally fabricated as respective, separate, semiconductor islands of amorphous, polycrystalline or microcrystalline silicon material or a plastics organic material defined by patterning a continuous semiconductor layer deposited over the substrate to leave discrete areas of semiconductor material arranged in a row and column matrix.

As the pixel pitch is greater than the base pitch, some pixel electrodes may cover more than one switching element. Electrical contact can be made with at least one of the covered switching elements via the contact holes in the dielectric layer. In a preferred embodiment of the present invention each pixel electrode is connected to and controlled by just one of the underlying switching elements. Therefore some switching elements are left redundant and are not used to supply signals to the pixel electrodes. An advantage of using only one switching element per pixel electrode is that there is less capacitive coupling between the row and column address conductors. This helps to reduce display artefacts such as cross-talk and flicker.

In another embodiment individual pixel electrodes may be addressed simultaneously by more than one underlying switching element. This can be done by connecting the associated adjacent row and column conductors together in parallel.

Although the base pitch and pixel pitch are substantially unrelated it is envisaged that there may be an integral relationship in which the pixel pitch is an integer multiple of the base pitch in both the horizontal and vertical components thereof. For example, where the horizontal pixel pitch is three times the horizontal base pitch and the vertical pixel pitch twice the vertical base pitch, each pixel electrode covers six switching elements. Therefore any one or more of these switching elements can be utilised if necessary to operate their associated overlying pixel electrode. According to a further aspect of the present invention the active matrix pixel device comprises an AMLCD device. In preferred embodiments the AMLCD device comprises a reflective or transflective type of display device.

Although the active matrix pixel device according to the present invention preferably comprises a liquid crystal display it is envisaged that the invention can be applied to other types of active matrix display devices, for example electrophoretic, electrochromic or electroluminescent display devices, and also to active matrix pixel devices for non-display purposes, for example sensor arrays such as image sensing arrays, etc.

BRIEF DESCRIPTION OF THE DRAWINGS

Embodiments of active matrix pixel devices and their method of fabrication in accordance with the invention will now be described, by way of example, with reference to the accompanying drawings, in which.

It should be understood that the Figures are merely schematic and are not drawn to scale. In particular, certain dimensions may have been exaggerated whilst others have been reduced. The same reference numerals are used throughout the drawings to indicate the same or similar parts.

DETAILED DESCRIPTION

Figure 1:
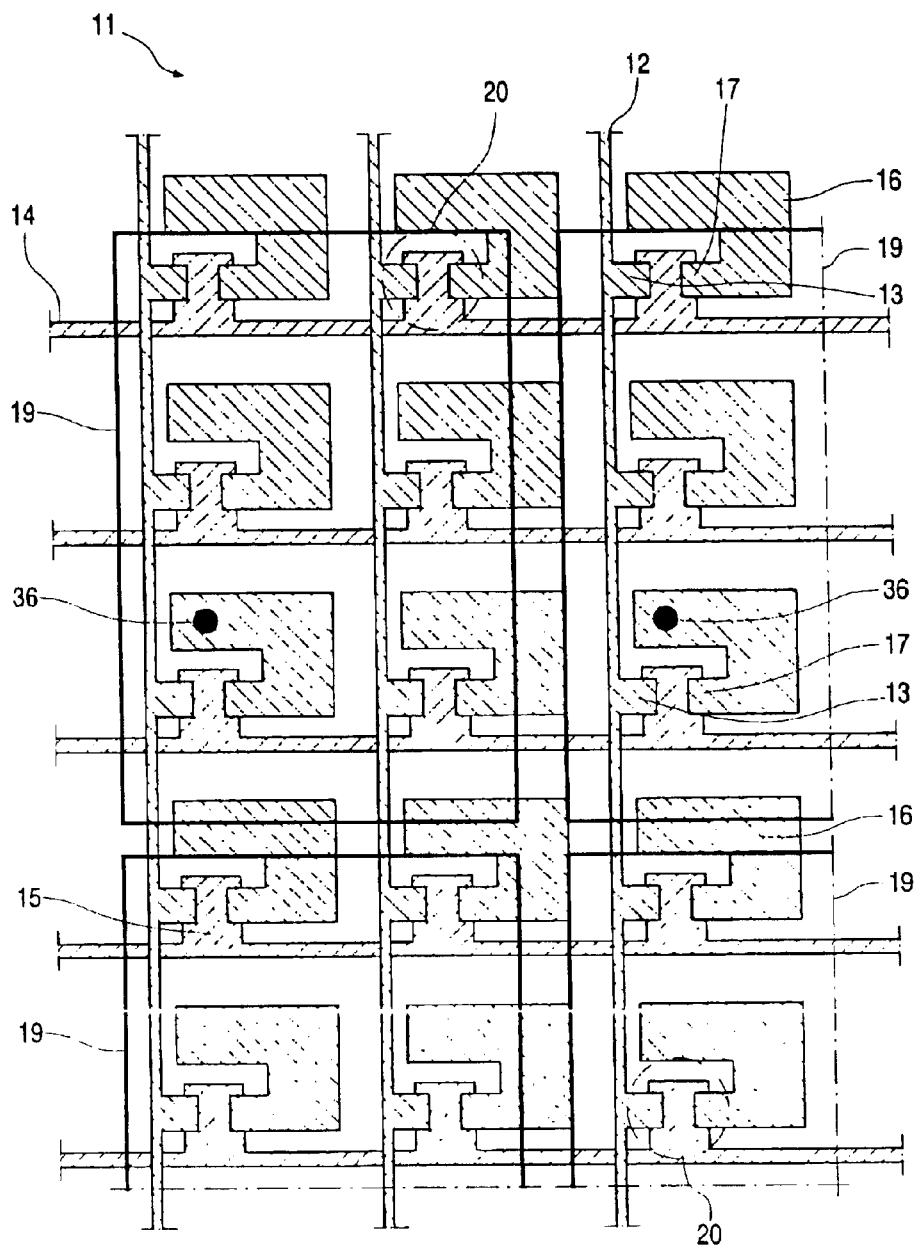
FIG. 1 is a plan schematic view of part of an active matrix pixel device fabricated by a first embodiment of the method in accordance with the present invention.

FIG. 1 illustrates schematically part of a device fabricated by a first embodiment of the method in accordance with the present invention. The device comprises a reflective type active matrix liquid crystal display (AMLCD) panel 11 having an array of pixel electrodes overlying a universal active matrix (UAM). It will be appreciated that FIG. 1 shows a small part of the AMLCD with only one complete pixel electrode and that a typical device will comprise an array having hundreds of pixel electrodes, e.g. around 150× 150 in the case of mobile phone displays. The UAM comprises on a substrate a circuit comprising a set of regularly spaced column address conductors 12 extending parallel to one another in the vertical direction and a set of regularly spaced row address conductors 14 extending parallel to one another in the horizontal direction. A switching element 20 comprising, in this example, a bottom gate type thin film transistor (TFT), is formed at, or near, each intersection of the row and column conductors. Each row conductor 14 provides the gate electrodes 15 for each TFT in a respective row. A layer of semiconductor material, not shown, overlies the gate electrode of each TFT. Each column conductor 12 provides the source electrodes 13 for each TFT in a respective column. Each source electrode overlaps partially with the TFT's gate electrode. Each TFT also comprises a drain electrode 17 formed from a layer of conductive material which drain electrode partially overlaps with each respective gate electrode 15 and which layer extends partially over the active cell defined by the adjacent row and column conductors forming an integral contact electrode 16.

The UAM comprising this array of TFTs and associated addressing conductors is common to all devices according to the invention. The TFTs are regularly spaced and define a base pitch. The base pitch is not necessarily the same in the horizontal and vertical directions. Elements of the display device using the part shown in FIG. 1, which will be described hereinafter, can be varied so as to customise the pixel pitch of the final product.

A dielectric layer, not shown in FIG. 1, completely overlies the array of active cells. An array of similarly sized and regularly spaced pixel electrodes 19 overlies the dielectric layer. Each pixel electrode 19 makes contact with at least one underlying contact electrode 16 via a contact hole 36 in the dielectric layer. The number, location and pitch of the contact holes 36 is dependant on the required pixel pitch of the final product. The embodiment of FIG. 1 shows part of a display device with a horizontal pixel pitch of just over one and a half times that of the horizontal UAM pitch. The vertical pixel pitch is about three times that of the vertical UAM pitch. The complete pixel electrode 19 shown covers two complete active cells including their respective TFTs and contact electrodes 16. This pixel electrode 19 makes contact with one contact electrode 16 via a contact hole 36. Therefore this pixel is addressed by only the row and column address conductor associated with that TFT. Similarly, each of the other pixel electrodes 19 in the array of pixel electrodes makes contact with one underlying contact electrode via a contact hole 36.

Although in the preferred embodiment of FIG. 1 each pixel electrode 19 only makes contact with one contact electrode 16 of one of the underlying TFTs, it is envisaged that contact can instead be made with a plurality of underlying contact electrodes such that each pixel can be addressed by more than one TFT. In this case, the row and column conductors associated with each of the TFTs would need to be addressed. This can be accomplished conveniently by interconnecting the row and column conductors respectively at their ends so that they receive the same drive (scanning and data) signals simultaneously.

FIG. 1 shows TFTs of the bottom-gate type where the gate electrode underlies the semiconductor material. Devices made in accordance with the present invention may instead comprise top-gate TFTs where the gate electrode overlies the semiconductor material.

Figure 2:
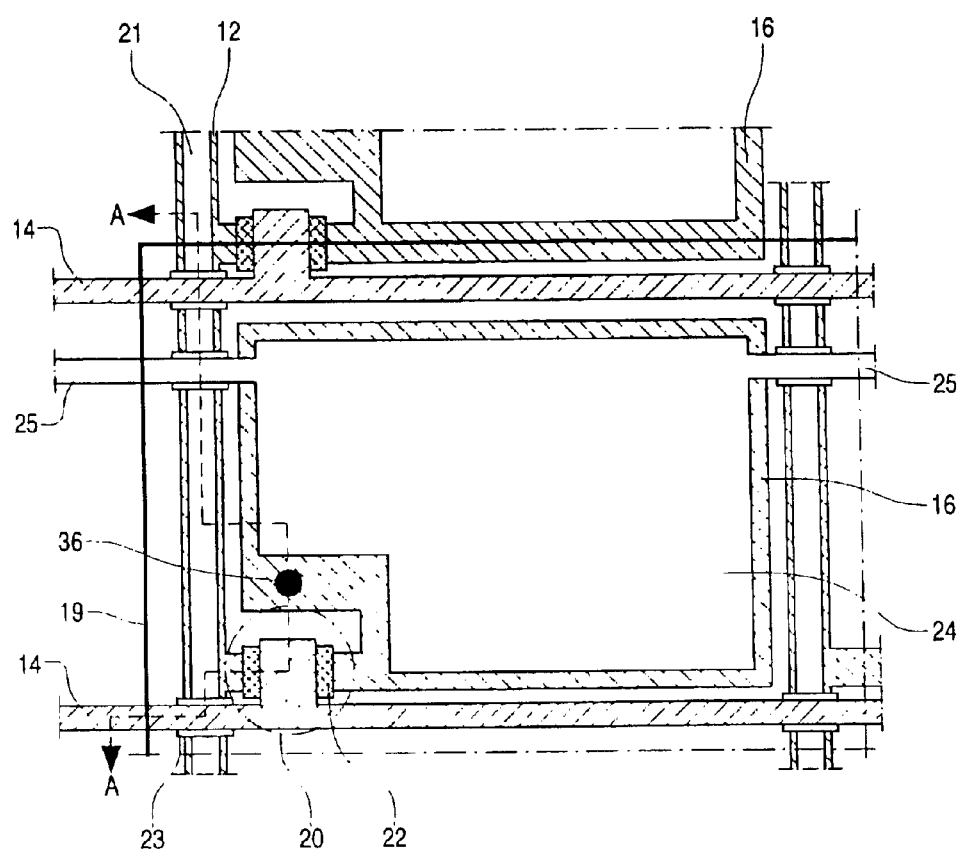
FIG. 2 is a plan schematic view of part of an active matrix pixel device fabricated by a second embodiment of the method in accordance with the present invention illustrating the structure of a typical active cell.

FIG. 2 is a schematic view of part of an active matrix pixel device fabricated by a second embodiment of the method in accordance with the present invention and shows an active cell of the UAM having one switching element 20 comprising a top-gate TFT, and a storage capacitor. The various stages of fabrication of the device of FIG. 2 are set out in FIGS. 3A to 3G which show a cross-section along the line A—A of FIG. 2. FIG. 4 is a process flow-chart summarising the separate stages of construction of a device having a base pitch which differs from the pixel pitch.

Figure 3A:
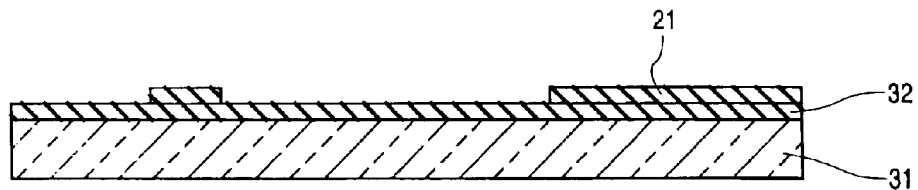
FIGS. 3A to 3G illustrate schematically in section various stages in the method of fabricating the device of FIG. 2.
Figure 4:
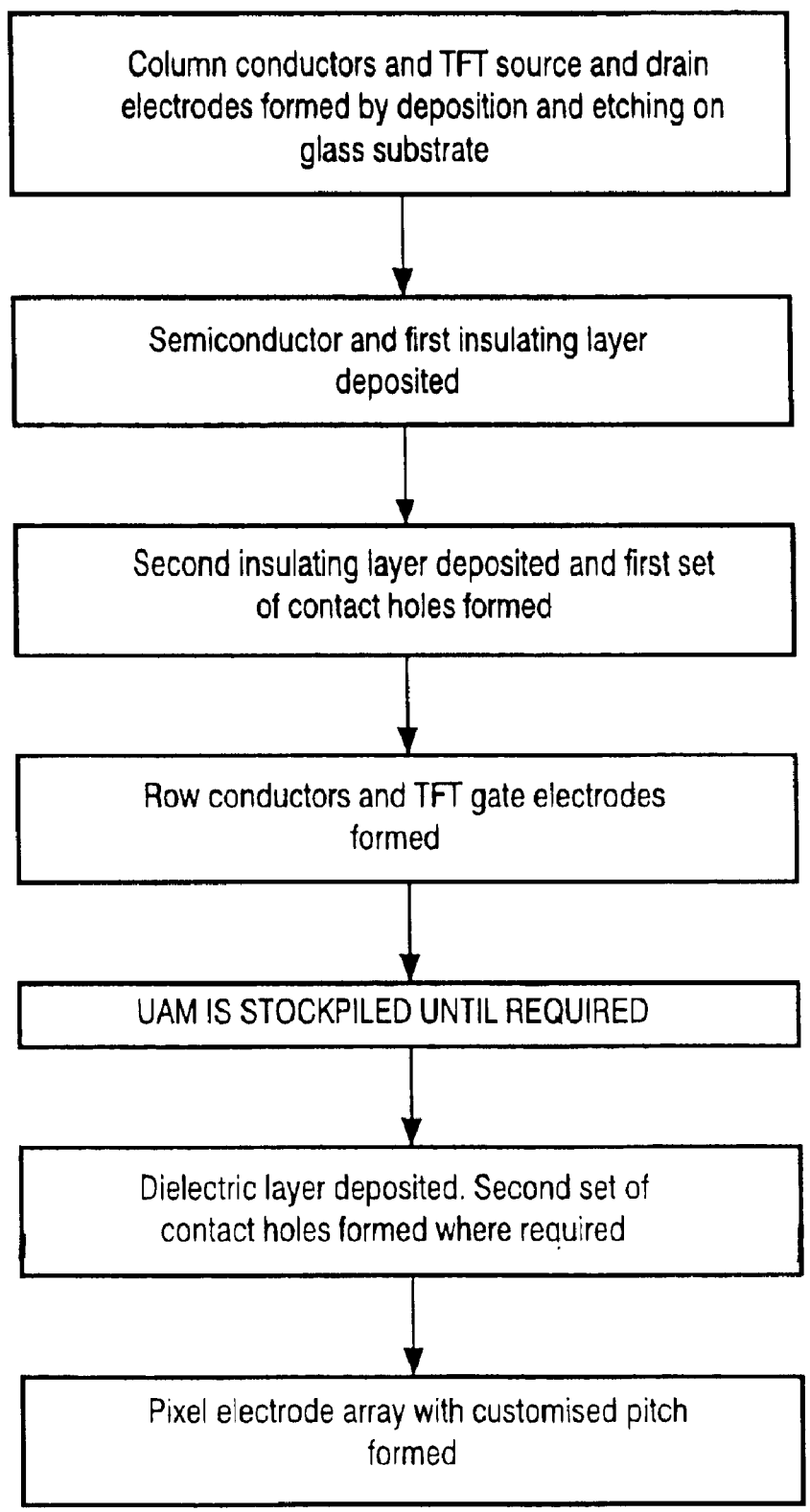
FIG. 4 is a flow-chart describing the method of construction as illustrated in FIGS. 3A to 3G.

With reference to FIG. 3A, a first conductive layer 32, preferably transparent, e.g. of Indium Tin Oxide (ITO), is deposited completely over an insulating substrate 31, preferably glass. A second conductive layer 21, preferably MoCr, is deposited on the first conductive layer 32. The second layer 21 is etched using a photolithographic patterning process to form an integral part of the column conductor 12. The material of the second conductive layer preferably has a higher conductivity than that of the first conductive layer.

Figure 3B:
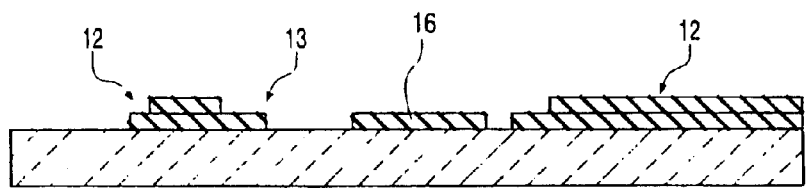

The first conductive layer 32 is then etched, as shown in FIG. 3B, so as to form the column conductors 12 with the source electrodes 13 for the TFTs and the contact electrodes 16 integral with the drain electrodes of the respective TFT. The contact electrodes 16 form the first plate for a storage capacitor.

Figure 3C:
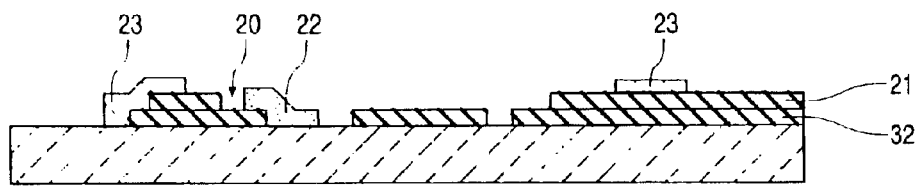

With reference to FIG. 3C, a semiconductor layer 22, preferably of amorphous-silicon, is then deposited and patterned so as to provide the active layer of the TFT. A first insulating layer, preferably of silicon-nitride (1), is deposited and patterned over the column conductors 12 to define selected insulator regions 23. These insulate the column conductors from the row conductors and other crossing features at their cross-over regions, which are added at a later stage.

Figure 3D:
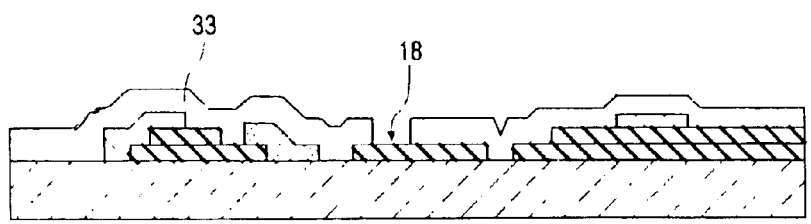

A second insulating layer 33, preferably of silicon-nitride (2), is deposited over the substrate. A respective contact hole 18 is formed through this layer over each contact electrode 16, as shown in FIG. 3D.

Figure 3E:
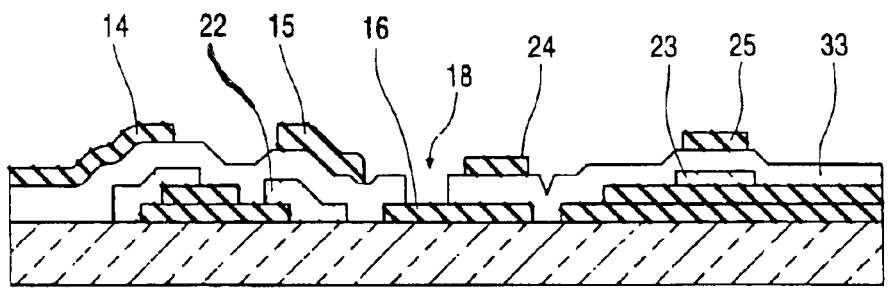

With reference to FIG. 3E, a metal layer, for example AlCu, is then deposited over the substrate. This is patterned photolithographically and etched to form the row conductors 14 with a gate electrode 15 for each TFT overlapping the semiconductor layer 22. The second storage capacitor plate 24 and respective capacitor conductor lines 25, extending parallel with the row conductors, for the storage capacitors are also patterned from this deposition. The insulating layer 33 therefore provides the intervening dielectric for the storage capacitors. This completes the construction of the UAM.

At this stage of the fabrication process the UAM is stockpiled for use in customised display panels. This UAM can then be used to produce a variety of active matrix display panels of this type, irrespective of their required pixel pitch. Only one mask set is required to produce the UAM and mask-sets that would otherwise be required for producing devices with other specific pixel pitches, up to this stage of production, are not required, therefore saving cost.

Figure 3F:
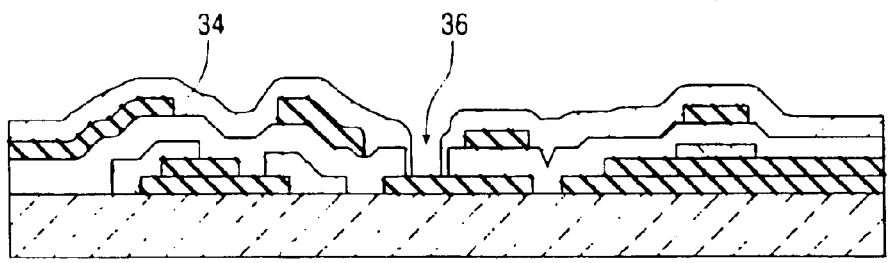

Once the required pixel pitch is known, the device can be customised as described hereinafter. With reference to FIG. 3F, a dielectric layer 34 of silicon-nitride (2) is deposited completely over the UAM. Contact holes 36 are formed in this at the required locations. The locations of the contact holes 36 correspond to selected ones of the contact holes 18 and are dependent on the required pixel pitch and the number of TFTs that are required for driving each pixel electrode 19. The dielectric layer 34 is also patterned to allow contact with the row and column conductors, 14 and 12, at the edge of the device for connection to the outputs of respective driver circuits (not shown).

Figure 3G:
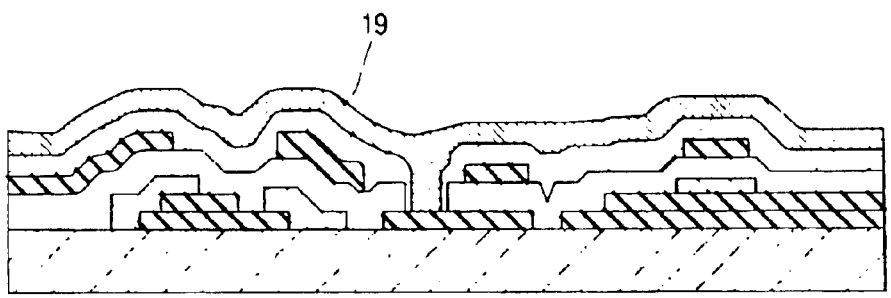

A further conductive layer is then deposited and patterned to form the reflective pixel electrodes 19 as shown in FIG. 3G. Each pixel electrode contacts at least one contact electrode 16 via a contact hole 36. The further conductive layer may be a metal or ITO on a silver or a silver alloy layer.

As can be appreciated, the size of the individual pixel electrodes 19 and their pitch can be varied as described for the customisation of the device.

FIG. 4, showing a flow-chart of the above described method of construction, illustrates that only two steps in the fabrication process are customised to meet the requirements of the desired pixel electrode pitch. This completes the fabrication of the active plate of the active matrix pixel device.

Figure 5:
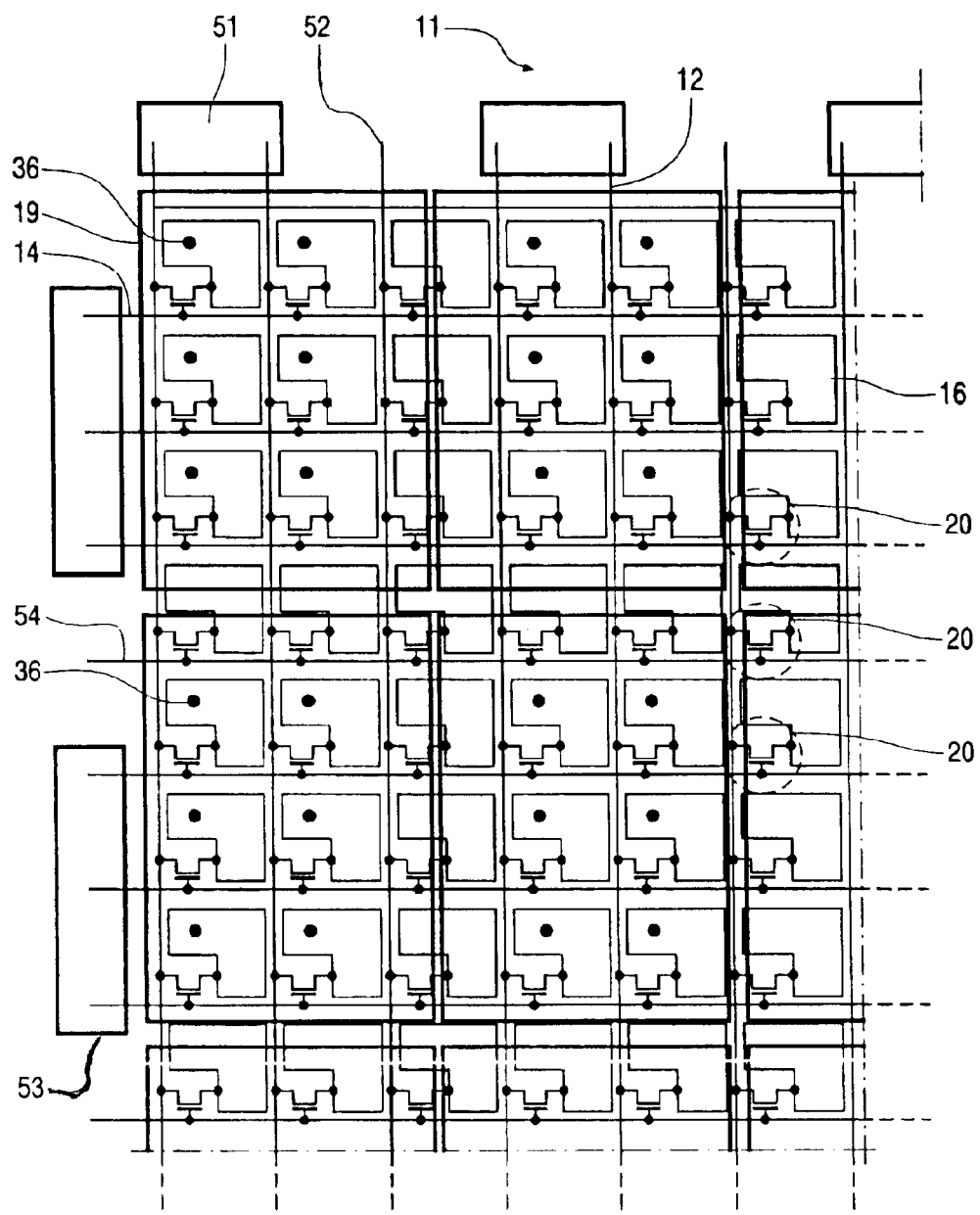
FIG. 5 is a plan schematic view of part of a device fabricated by a third embodiment of the method according to the present invention.

FIG. 5 shows part of an active matrix pixel device fabricated by a third embodiment of the method according to the present invention. The device comprises row and column conductors, 14 and 12, as described hereinbefore with reference to the previous embodiments. However, each pixel electrode 19 is connected to a plurality of contact electrodes 16 via contact holes 36 and each pixel electrode is therefore controlled by more than one TFT. From the figure it will be appreciated that there is a non-integral relationship between the base pitch and the pixel pitch. The horizontal pixel pitch is a little under two and a half times that of the horizontal base pitch. The vertical pixel pitch is a little under three and a half times that of the vertical base pitch. Each pixel electrode 19 in a device with a pitch relationship of this kind will overlie at least six complete active cells and therefore six corresponding TFTs. The adjacent column conductors 12 that address each column of cells that a pixel electrode overlies are connected together by a shorting bar 51. Each column of TFTs associated with each shorting bar 51 are therefore addressed in parallel. The adjacent row conductors 14 associated with cells that a pixel electrode overlies are connected together with a similar shorting bar 53. The rows of TFTs associated with each shorting bar 53 are therefore each selected in parallel. Due to the non-integral relationship between the base pitch and pixel pitch, there are redundant column conductors 52 and redundant row conductors 54. These may be shorted together to keep all redundant row or column conductors at a fixed potential if required. Cells which underlie two adjacent pixel electrodes are not provided with contact holes 36.

Figure 6:
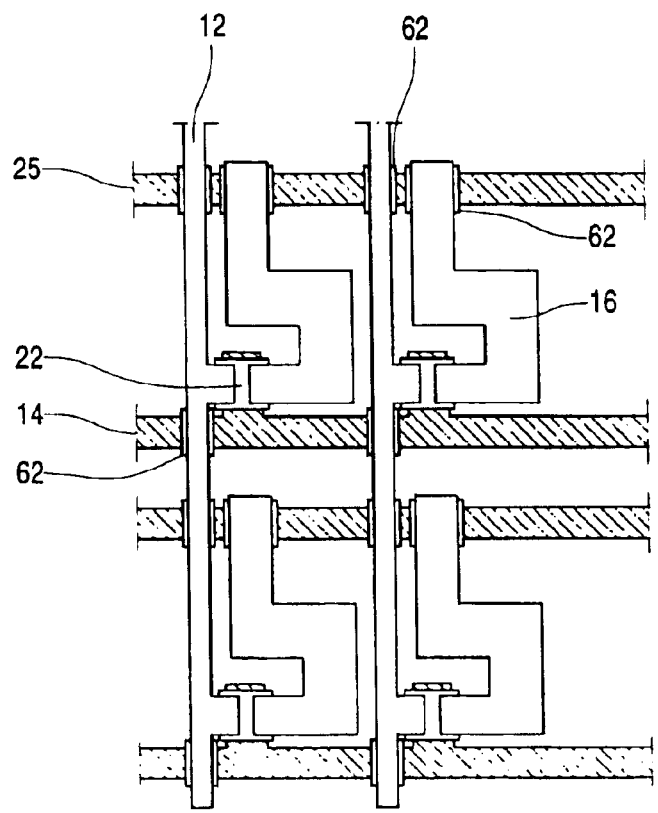
FIG. 6 illustrates one preferred arrangement of part of the device during its fabrication.
Figure 7:
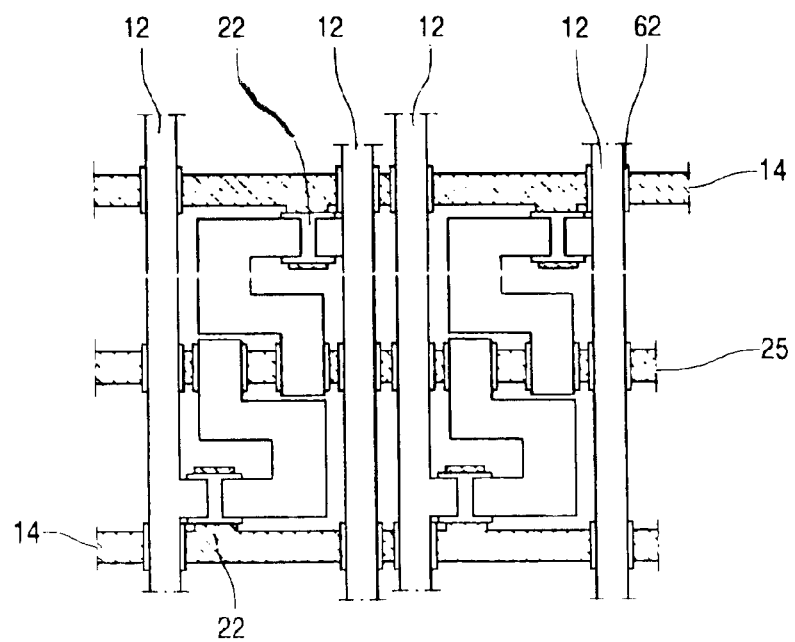
FIG. 7 illustrates a second preferred arrangement of part of the device during its fabrication.

FIGS. 6 and 7 show alternative layouts for the TFT electrodes of the UAM. They both employ a bottom gate TFT similar to that of the embodiment illustrated in FIG. 1. The column conductors 12, row conductors 14 and capacitor conductor lines 25 are insulated from one another by an intervening layer of insulating material 62. A semiconducting layer 22 forms the active layer of each TFT and contacts with the source, drain and gate electrodes. In this arrangement a storage capacitor is provided at an overlap region between the contact electrode 16 and the capacitor conductor line 25. The insulating material 62 forms the dielectric for the storage capacitor for each cell by separating the corresponding capacitor conductor 25 from an area of the contact electrode 16.

To maximise the achievable range of pixel pitches for the final product, it is desirable to have a relatively small base pitch. FIG. 6 shows one possible arrangement where each row of TFTs has a corresponding capacitor conductor line 25 and each column of TFTs has a corresponding column conductor 12. In order to minimise the base pitch, special layouts can be utilised as illustrated in FIG. 7. Here, each column of TFTs corresponds to two column conductors 12. Pairs of adjacent TFT rows share one storage capacitor conductor line 25. This makes better use of the array space. Under normal conditions, such an arrangement would lead to undesirable image artefacts as the local environment of different rows and columns differ. However, where the individual pixels are driven by more than one TFT, these effects will be reduced as some averaging will take place over the area of the individual pixels.

The manufacturing process may comprise the further step (not shown) of depositing a Diffusing Organic Layer (DOL) over the UAM after forming the TFT switching elements and the storage capacitors as described with reference to FIGS. 2, 3 and 4. This comprises a layer of bumps which, after the customised layers are deposited, results in corresponding bumps being formed in the pixel electrodes. In the completed display device, these pixel electrode bumps serve to diffuse the reflected light so as to ensure non-specular reflection when viewed. This type of layer is described in EP-A-0617310. An alternative method of ensuring non-specular reflection is to incorporate a front scattering film on the passive plate of the display panel.

Figure 8:
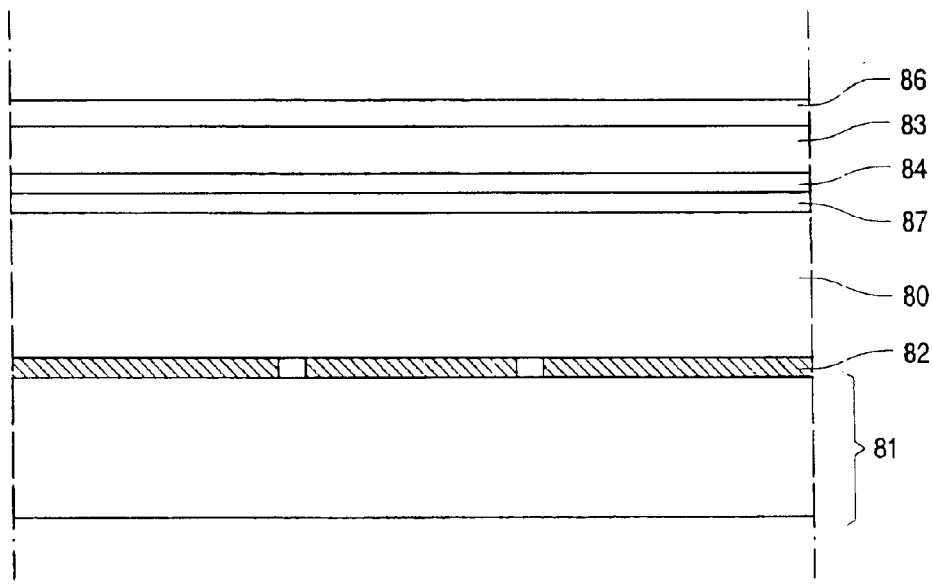
FIG. 8 shows schematically the structure of a complete AMLCD.

FIG. 8 shows the structure of a complete liquid crystal display which incorporates the active plate comprising the UAM, here referenced generally at 81, and the customised pixel electrode layer 82. A layer of liquid crystal material 80 is provided over the pixel electrode layer 82, which comprises the structure described above. The second, passive, substrate, here shown at 83, overlies the layer of liquid crystal material. This further substrate 83 may be provided on one face with an arrangement of colour filters 84 and a layer defining the common electrode 87. A polarising film 86 is also provided on the substrate 83.

As this invention is concerned specifically with the active, transistor, substrate and the reflective pixel electrodes, the operation and construction of the liquid crystal display will not be described in any further detail as this will be apparent to those skilled in the art.

Additional layers to those described may be provided, and there are various alternatives which will be apparent to those skilled in the art. The specific processing parameters and materials have not been described in detail in this application, as this invention relies upon known individual processing steps and materials. The steps, and the range of possible alternatives, will be apparent to those skilled in the art.

The specific example above uses amorphous silicon TFTs in the UAM of the LCD, but other semiconductor materials are possible, such as polycrystalline or microcrystalline silicon.

From reading the present disclosure, other modifications will be apparent to persons skilled in the art. Such modifications may involve other features which are already known in the field of active matrix pixel devices and component parts therefor and which may be used instead of or in addition to features already described herein.

What is claimed is:

1. An active matrix pixel device comprising:

a universal active matrix having crossing column and row conductors that define a plurality of active cells, said universal active matrix further including a switching element in each active cell; and a pixel array of pixel electrodes adjacent said universal active matrix, wherein each pixel electrode extends over more than one active cell; and wherein each pixel electrode electrically connects to at least one switching element.

2. The device of claim 1, wherein a dielectric layer separates the universal active matrix and the pixel array.

3. The device of claim 1, wherein the dielectric layer includes contact apertures that enable each pixel electrode to electrically connect to a switching element.

4. The device of claim 1, wherein only one switching element electrically connects to each pixel electrode.

5. The device of claim 1, wherein each pixel electrode extends over more than one active cell in bath the vertical and horizontal directions.

6. The device of claim 1, wherein each pixel electrode extends over an integral number of active cells.

7. The device of claim 1, wherein the switching elements comprise thin film transistors.

8. An active matrix display, comprising:

an active substrate;

a universal active matrix on said active substrate, said universal active matrix comprising crossing column and row conductors that define a plurality at active cells, said universal active matrix further including a switching element in each active cell; and a pixel array of pixel electrodes on said universal active matrix, wherein each pixel electrode extends over more than one active cell; and wherein each pixel electrode electrically connects to at least one switching element.

9. The display of claim 8, further including a passive substrate adjacent said active substrate and a liquid crystal material disposed between said passive substrate and said active substrate.

10. The display of claim 8, wherein only one switching element electrically connects to each pixel electrode.

11. The display of claim 8, wherein each pixel electrode extends over more than one active cell both vertically and horizontally.

12. The display of claim 8, wherein each pixel electrode extends over an integral number of active cells.

13. The display of claim 8, wherein the switching elements comprise thin film transistors.

14. The display of claim 12, wherein the switching elements comprise amorphous silicon thin film transistors.

15. The display of claim 8, wherein the display is a reflective display.

* * * * *